UNITED STATES PATENT OFFICE.

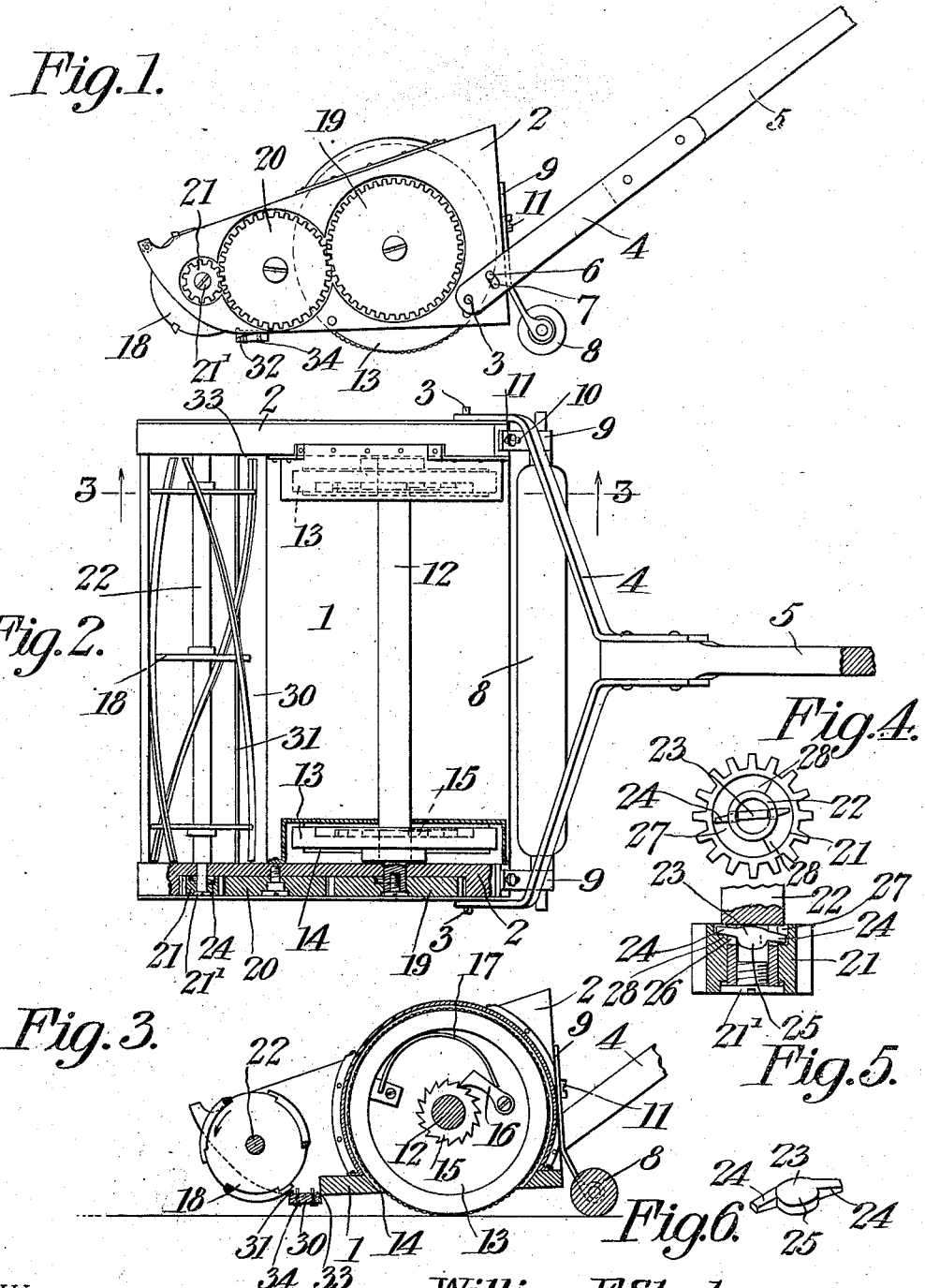

WILLIAM ELMER STEUBEN, OF VISALIA, CALIFORNIA.

LAWN-MOWER.

No. 900,443.　　　Specification of Letters Patent.　　　Patented Oct. 6, 1908.

Application filed August 6, 1906. Serial No. 329,394.

*To all whom it may concern:*

Be it known that I, WILLIAM ELMER STEUBEN, a citizen of the United States, residing at Visalia, in the county of Tulare and State of California, have invented a new and useful Lawn-Mower, of which the following is a specification.

This invention relates to lawn mowers.

The object of the invention is to provide a strong, simple, durable, inexpensive and thoroughly efficient lawn mower having a plurality of drive wheels which are loosely mounted upon a drive shaft and are each provided with an individual ratchet mechanism, so that the drive shaft will always be rotated at the speed of the fastest drive wheel and will thus transmit the rotation of the fastest drive wheel to the rotary cutter, it being understood that on account of irregularities in the ground, it sometimes happens that one of the drive wheels will have a tendency to rotate more rapidly than the other, this being the case also when the lawn mower is turning a curve.

A further object of the invention is to provide a lawn mower in which the gear mechanism between the drive shaft and the rotary cutter is provided with a second set of ratchets, in addition to the ratchets between the drive wheels and the drive shaft, so that when the machine is stopped, the cutter can continue to rotate on account of its momentum, without having its rotation retarded by the idle gear wheels, which it would otherwise have to carry with it.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of the following claims without departing from the spirit of the invention or sacrificing any of its advantages.

In the accompanying drawings forming part of this specification: Figure 1 is a side elevation of a lawn mower equipped with the improvements of the present invention. Fig. 2 is a plan view thereof, partly in section. Fig. 3 is a vertical section on the line 3—3 of Fig. 2. Fig. 4 is a detail view of one of the pinions and rocking members. Fig. 5 is a detail sectional view through one end of the cutter shaft and pinion. Fig. 6 is a detail perspective view of one of the rocking members.

Like reference numerals indicate corresponding parts in the different figures of the drawings.

The frame of the improved lawn mower preferably consists of a base 1 and a pair of side plates 2, which may be of any suitable form and construction. Pivotally connected with the side plates 2, as indicated at 3, is the yoke 4 of the handle 5, the up and down pivotal movement of which is limited by means of pins 6 which extend through suitable slots 7 in the yoke 4, as shown. The improved lawn mower is provided with an adjustable supporting roller 8, the adjustment of which is secured by means of journal brackets 9 formed with longitudinal slots 10 to receive adjusting screws 11, which extend into the rear ends of the side plates 2. It will be obvious that by loosening the screws 11, the supporting roller 8 can be adjusted vertically by moving the journal brackets 9.

Suitably journaled in the side plates 2 is a drive shaft 12 upon which is loosely mounted a pair of drive wheels 13 which are adapted to contact with the ground through suitable openings 14 in the base 1 of the frame. The peripheries of the drive wheels 13 preferably are roughened, as shown, so as to secure a good grip upon the ground. Adjacent each of the drive wheels 13, the drive shaft 12 is provided with a ratchet wheel 15 which is engaged by a pawl 16 mounted upon the drive wheel and held in engagement with the ratchet by means of a spring 17. It will be obvious that as each of the drive wheels 13 is provided with an individual ratchet connection with the drive shaft 12, said shaft will always be rotated at the speed of the fastest drive wheel 13. In other words, when the lawn mower is moving over irregular ground or working upon a curve so that one of the drive wheels rotates more rapidly than the other, the drive shaft will be operated by means of the pawl 16 mounted upon the fastest drive wheel. In order to connect the drive shaft 12 with the rotary cutter 18, so as to transmit the fast movement of said shaft 12 to said cutter, gear wheels 19 are rigidly mounted upon the opposite ends of the shaft 12, as shown, said gear wheels being preferably fitted into suitable cut away portions of the side plates 2 and being keyed upon the shaft 12 in any suitable manner.

The gear wheels 19 are in mesh with intermediate gear wheels 20 journaled in suitable recessed portions of the side plates 2 and meshing, in turn, with pinions 21 which are mounted loosely upon the opposite ends of the cutter shaft 22. Each of the pinions 21 is provided with a ratchet connection with the cutter shaft 22 so that when the lawn mower is stopped, the said cutter shaft 22, together with the cutter 18, can continue to rotate through its momentum without having its movement retarded by the pinions 21, intermediate gear wheels 20 and drive gear wheels 19. The purpose in view in providing two sets of gear wheels 19 and 20 and pinions 21, is to apply motion equally to both ends of the cutter shaft 22 so as to prevent any twisting action or strain upon said cutter shaft such as would occur if power were applied to only one end thereof. It will be obvious from the foregoing description that two separate sets of ratchet mechanism are interposed between the drive wheels 13 and the rotary cutter 18 so that, as before explained, the drive wheels can rotate at different speeds without depriving the rotary cutter of the benefit of the speed of the fastest drive wheel, and so that the rotary cutter can continue to rotate after the lawn mower has been stopped without having its rotation retarded by the dragging action of the gear wheels and pinions 19, 20 and 21.

In view of the fact that it is necessary to provide small ratchet mechanism between the pinions 21 and the cutter shaft 22, I prefer to employ a novel form of mechanism consisting of rocking members 23 which are formed with oppositely extending beveled arms 24 and an approximately circular central portion 25. The circular central portion 25 of each rocking member 23 is mounted for rocking movement in a longitudinally extending slot 26 in each end of the cutter shaft 22, so that the beveled arms 24 project from opposite sides of the slot and fit into an annular chamber 27 formed in the adjacent pinion 21. The inner wall of the annular chamber 27 is formed with a plurality of ratchet or cam teeth 28 which are adapted to be engaged by the beveled arms 24 of the rocking member 23. The cam teeth 28 are so arranged that each of said teeth will be diametrically opposite the space between two adjacent teeth on the opposite side of the pinion. For this reason, as the beveled arm 24 at one end of the rocking member rides up one of the cam teeth 28, the member 23 will be rocked so that the arm 24 at the opposite end thereof will enter the space between two adjacent cam teeth. In this way, while the cutter shaft is rotating idly with respect to the pinions 21, the members 23 will be caused to rock back and forth on account of the fact that first one of the arms 24 will be engaged by one of the cam teeth 28 and rocked outward, and then the opposite arm 24 will be engaged by another cam tooth and rocked outward, it being understood that when one of the arms 24 is rocked outward by riding over a cam tooth, the other arm will be rocked inward so as to fit into the space between two adjacent teeth on the opposite side of the pinion. It will be obvious, therefore, that one of the arms 24 will always be located within the space between two of the teeth 28 so as to be engaged by the straight side of one of said teeth when the pinion begins to rotate, whereby a positive ratchet action between the pinions and the cutter shaft 22 will always be secured in an automatic manner without the use of springs or other devices. Each of the pinions 21 preferably is held in place by means of a retaining screw 21' which is fitted into a suitable socket in the end of the cutter shaft 22 and is provided with a suitable washer. The retaining screw 21' is located a short distance away from the pinion 21 so as to permit a very slight longitudinal play of the pinion upon the cutter shaft 22.

I have found, in practice, that the ratchet mechanism, consisting of the rocking members 23, works more easily if the pinion 21 be mounted in such manner that it is capable of moving slightly toward and away from the rocking members 23. The oppositely extending arms 24 are formed with beveled faces, as shown, so as to ride more easily over the cam teeth 28 when the cutter is rotated by momentum and at the same time to present straight faces to be engaged by the straight faces of said cam teeth when it is desired to rotate the cutter shaft through the medium of the pinions 21. In practice, it is advantageous to inclose the drive wheels 13 and gear wheels 19 and 20 in a suitable casing, as shown, to prevent them from becoming clogged.

While any suitable form of shear 30 may be employed, I prefer to use the form of shear illustrated in the drawing, having the upstanding blade 31 which coöperates with the cutter 18, and the curved bearing or cam surfaces 32 which bear upwardly against the bottom edges of the side plates 2, as shown, the shear being formed with shoulders 33 which bear against the inner edges of the side plates 2 so as to prevent lateral displacement of the shear. The cam surfaces 32 constitute means for permitting a rocking movement of the shear upon the side plates 2, this rocking movement being accomplished by means of a pair of screws or adjusting devices 34 which extend into the side plates 2, as shown. By loosening one of the pair of screws 34, for example, those at the rear end of the shear, and by simultaneously tightening the screws at the forward end thereof, it will be obvious that the shear will be rocked upon the cam surfaces 32 so as to raise its upstanding blade nearer to the periphery of the cutter 18.

From the foregoing description, it will be apparent that a plurality of ratchet mechanisms are interposed between each of the drive wheels 13 and the cutter 18, the advantages of which arrangement, as previously explained, are, first, that the cutter will be rotated by the fastest drive wheel, second, that the cutter can rotate by reason of its momentum, after the drive wheels have stopped, without being retarded in its motion by the intermediate gearing between the cutter and the drive wheels, and third, the lawnmower may be drawn rearwardly with greater ease, as the ratchet mechanism on the ground wheels 13 relieves it of the drag which the gearing 19, 20 and 21 would otherwise cause.

The improved lawn mower of this invention is strong, simple, durable and inexpensive in construction as well as thoroughly efficient in operation.

What is claimed is:

A lawn mower having a frame consisting of a base and a pair of side plates, a drive shaft journaled in said side plates, a pair of drive wheels loosely mounted on said shaft and adapted to contact with the ground through openings in said base, each of said drive wheels having a ratchet connection with said drive shaft, a cutter shaft journaled in said side plates and having a cutter mounted thereon, said cutter shaft being formed in its ends with slots, a rocking member mounted in each of said slots and having oppositely extending beveled arms projecting therefrom, a pinion mounted on said cutter shaft adjacent each of said rocking members and having an annular chamber provided with cam teeth adapted alternately to engage the oppositely extending arms of said rocking member so as to rock the same in said slot, and gear wheels connecting said pinions with said drive shaft.

In testimony that I claim the foregoing as my own, I have hereto affixed my signature in the presence of two witnesses.

WILLIAM ELMER STEUBEN.

Witnesses:
L. C. HYDE,
JOS. SHERMAN.